Patented July 20, 1954

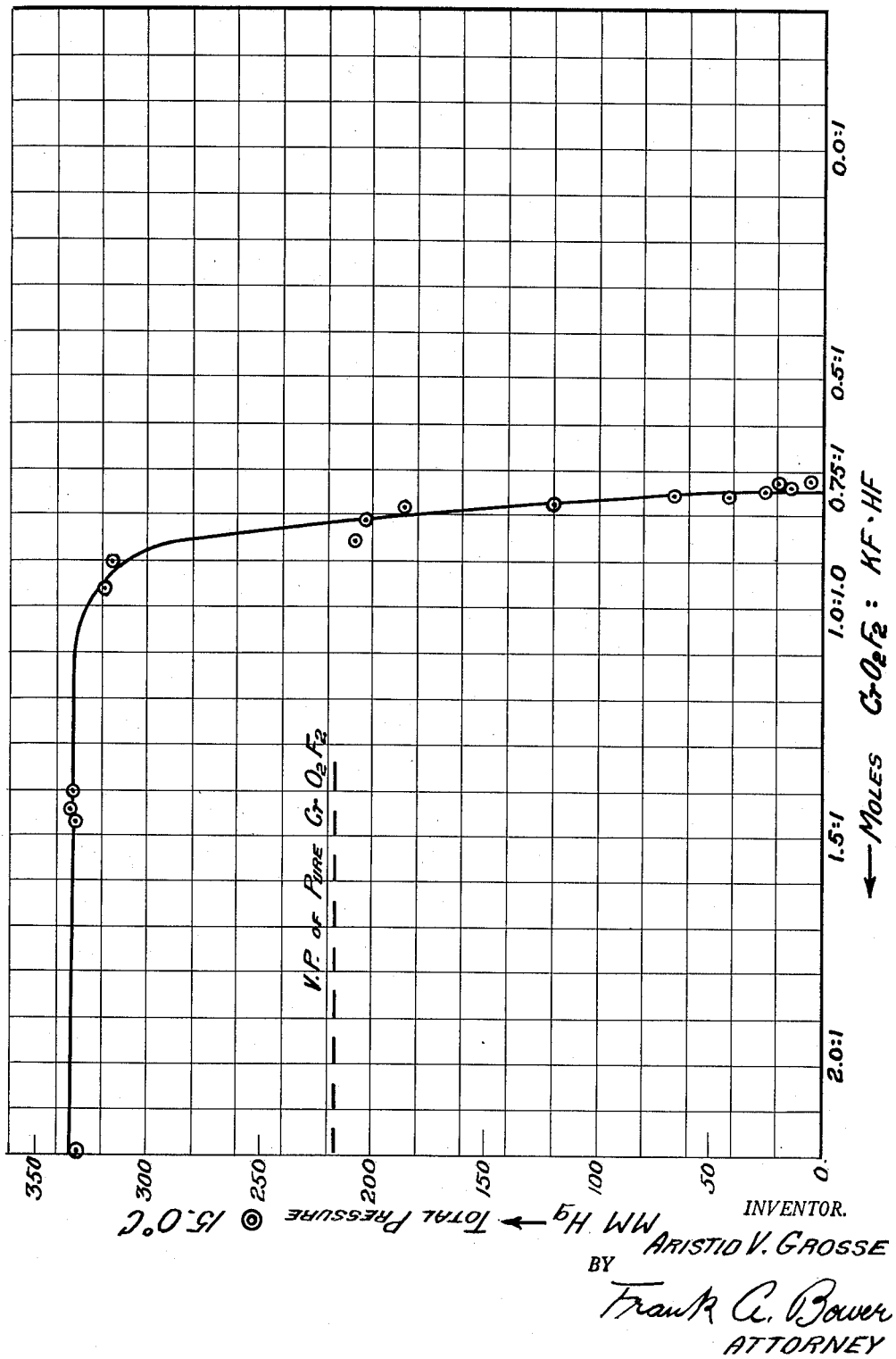

2,684,284

UNITED STATES PATENT OFFICE 2,684,284

PREPARATION AND PURIFICATION OF CHROMYL FLUORIDE

Aristid V. Grosse, Haverford, Pa., assignor to Research Institute of Temple University, Philadelphia, Pa., a corporation of Pennsylvania Application August 11, 1951, Serial No. 241,497

2 Claims. (Cl. 23—86)

This invention relates to the preparation and purification of chromyl fluoride.

Among the more important objects of this invention are:

The preparation of pure chromyl fluoride.
The preparation of stable chromyl fluoride.
The purification of chromyl fluoride produced from chromium trioxide and hydrogen fluoride.

The above and other objects appearing hereinafter are accomplished by the following invention which comprises reacting hydrogen fluoride with chomium trioxide and separation of a pure chromyl fluoride from the product. The accompanying figure shows a chart of a chromyl fluoride, potassium fluoride and hydrogen fluoride system.

The general purpose of this invention is the irreversible preparation of chromyl fluoride $CrO_2F_2$. Chromium trioxide, $CrO_3$, readily reacts with anhydrous hydrogen fluoride. The chromyl fluoride product formed by this reaction is easily hydrolyzed back to chromium trioxide by water and the gaseous chromyl fluoride is hydrolyzed instantly by water vapor to form a chromium trioxide powder.

$$CrO_3 + 2HF \rightleftharpoons H_2O + CrO_2F_2$$

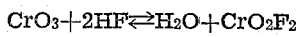

In the practice of this invention a large excess of anhydrous hydrogen fluoride reacted with chromium trioxide produces stable chromyl fluoride. The chromyl fluoride product is separated from water. The chromyl fluoride product is then purified by combining any hydrogen fluoride impurity, left in the chromyl fluoride, with an alkali fluoride to form a triple compound with a molar ratio of chromyl fluoride to the alkali bifluoride.

Compounds found especially suitable for use in the process of purification include sodium and potassium fluorides NaF and KF. These compounds are highly effective for the purification of chromyl fluoride, especially chromyl fluoride containing hydrogen fluoride impurities.

It has been found that when an excess of hydrogen fluoride is reacted with chromium trioxide in the preparation of chromyl fluoride that a stable product is obtained. When the molar ratio between the hydrogen fluoride and the chromium trioxide is a range of 12 to 14 parts by weight of hydrogen fluoride to one of chromium trioxide, the excess hydrogen fluoride and the water formed in the reaction may be removed by decantation upon cooling below the point of crystallization of the chromyl fluoride. The residual hydrogen fluoride impurity in the separated chromyl fluoride may be removed by purification.

A method of purification has been found in combining the hydrogen fluoride impurity and chromyl fluoride with an alkali fluoride to form a triple compound. Only a molar proportion of chromyl fluoride reacts in forming this triple compound. Consequently, when a small proportion of hydrogen fluoride is present as an impurity in a large proportion of chromyl fluoride, the hydrogen fluoride can be completely removed from the greater portion of chromyl fluoride upon sacrificing a lesser portion of the chromyl fluoride to combination in a triple compound of chromyl fluoride, hydrogen fluoride and alkali fluoride.

The following example, in which parts and percentages are by weight unless otherwise stated, illustrates the more detailed practice of the invention but is not to be construed as limitative.

Two hundred and fifty grams, or two and one-half moles of chromium trioxide were placed in a copper flask, to which was added 600 grams, or 30 moles, of anhydrous hydrogen fluoride. The reaction mixture was maintained at room temperature for a few hours with occasional shaking. The reaction mixture was then cooled by cooling the flask in Dry Ice. The reaction mixture temperature was reduced to about —78° C. At this temperature chromyl fluoride formed by the reaction was in crystalline form and the excess hydrogen fluoride was in a liquid state. Water formed in the reaction was dissolved in the acid and thus in the liquid phase.

The chromyl fluoride thus prepared may be separated from the excess hydrogen fluoride and the water formed in the formation reaction by decantation of the liquid hydrogen fluoride and the water. It has been found that at the low temperatures in the range of the liquefaction of hydrogen fluoride that chromyl fluoride has a low solubility in hydrogen fluoride. The chromyl fluoride crystallizes nicely from the hydrogen fluoride.

A further separation of chromyl fluoride from hydrogen fluoride by isolation may be obtained by warming the residual chromyl fluoride to above 31.6° C. or the melting point of chromyl fluoride and again cooling the chromyl fluoride product a second time. A further separation of solid chromyl fluoride crystals from liquid hydrogen fluoride and a small amount of water may thus be obtained. The top layer of hydrogen fluoride and water may be again decanted. Further separation may be obtained by distillation of the chromyl fluoride product. Hydrogen fluoride has a low heat of vaporization and a lower boiling point as compared to the heat of sublimation of solid chromyl fluoride. Chromyl fluoride crystals sublime and reach a pressure of 760 mm. at 30° C.

The separated chromyl fluoride may contain a slight hydrogen fluoride impurity. As mentioned above such minor hydrogen fluoride impurity can be effectively and efficiently removed by the formation of a triple compound containing chromyl fluoride, hydrogen fluoride and an alkali fluoride. It has been discovered that chromyl fluoride combines in such a triple compound in an equal molar proportion to the alkali bifluoride which forms from the alkali fluoride and hydrogen fluoride.

According to this invention, chromyl fluoride containing hydrogen fluoride impurity is distilled through a tube containing an alkali fluoride, potassium fluoride for example. The hydrogen fluoride together with a portion of the chromyl fluoride combine with the alkali fluoride. In this manner the hydrogen fluoride is completely removed from the chromyl fluoride, so that the uncombined chromyl fluoride is entirely free of hydrogen fluoride.

The molar proportions of the components in the triple compound were determined by a study of the triple compound $CrO_2F_2$, KH, HF, potassium bifluoride and chromyl fluoride. In the accompanying figure a chart is shown of the results obtained in removing aliquot amounts of the gas phase over a triple compound which was subjected to successive pumpings at a constant temperature of 15° C. In the figure the molar proportion of chromyl fluoride to the potassium bifluoride is shown on the abscissa, while the pressure over the compound is shown on the ordinate.

Chromyl fluoride was condensed over this pure bifluoride in a molar ratio of 2.2 $CrO_2F_2$ to 1 $KHF_2$. In the initial part of the curve the vapor pressure was appreciably above the vapor pressure of pure chromyl fluoride, indicating that a more volatile constituent was being pumped off together with the chromyl fluoride. This volatile constituent proved to be hydrogen fluoride. This quantity corresponded to a decrease of about 0.2 to 0.25 mole of hydrogen fluoride in the original $KHF_2$. The pressure of the system rapidly decreases at a molar ratio of about 1:1 to about 0.9:1 and reaches a value of below 4 mm. of Hg at 0.75:1.

These results indicate that at about a molar rate of 1 to 1 for potassium bifluoride and chromyl fluoride the pressure over the triple compound decreases sharply to a negligible amount. This demonstrates that the stable combination of chromyl fluoride with potassium bifluoride is at the above mentioned molar ratio.

As a group the alkali fluorides are available for the formation of a triple compound with hydrogen fluoride and chromyl fluoride. Lithium fluoride, however, is not as effective in forming a triple compound because of its similarity to magnesium fluoride. Rubidium and ceasium compounds are not practical in volume because of cost of the compounds.

It will be seen that the process of purification of chromyl fluoride by formation of the triple compound places particular emphasis on the importance of the maximum degree of separation of hydrogen fluoride from chromyl fluoride before the purification step. A greater degree of this pre-purification separation leads to a greater quantity of purified chromyl fluoride product.

It will be understood that this invention is not limited to the above described method of producing chromyl fluoride but that it can be applied to chromyl fluoride produced other than by reaction between chromium trioxide and hydrogen fluoride. For example, chromyl fluoride may be prepared according to this invention from the reaction between chromium trioxide and fluorosulfonic acid. The following equation represents this reaction:

$$CrO_3 + 2F.SO_2.OH \rightarrow CrO_2F_2 + H_2S_2O_7$$

This reaction requires two moles of fluorosulfonic acid to one mole of chromium trioxide and it has been discovered that it is preferable in producing a stable product to react at least three moles of fluorosulfonic acid with one mole of chromium trioxide. The chromyl fluoride produced according to this latter reaction is separated and purified according to the same procedure described above in connection with the chromyl fluoride produced from hydrogen fluoride.

The chromyl fluoride produced according to this invention is a stable monomer which forms at room temperature either deep violet-red crystals, an orange red liquid or a red-brown gas. The crystals sublime readily and beautifully and reach a pressure of 760 mm. at 30° C. The crystals melt at 31.6° C. The vapor pressure at the triple point is 873 mm. of Hg. As mentioned above chromyl fluoride crystallizes from substantially anhydrous hydrogen fluoride on cooling.

The process of this invention is advantageous in providing a method of producing a pure, stable chromyl fluoride. Chromyl fluoride is a variable product which is particularly advantageous as it can be readily stored and is a strong oxidizing agent.

A further aspect of this invention is seen in the recovery of the hydrogen fluoride from the decantate which is removed from the chromyl fluoride. The decantate of hydrogen fluoride containing about 7% water by weight and about 1-2 wt. per cent $CrO_2F_2$ can be converted into pure HF for reuse by simply reducing the $CrO_2F_2$ to trivalent chromium, in the form of chromic fluoride ($CrF_3$), with any suitable reducing agent. Such an agent is, for example, ammonium fluoride, $NH_4F$; it is reduced by $CrO_2F_2$ to $N_2$ and $H_2O$ and thus no additional impurity is introduced into the liquid acid. If such an impurity is not detrimental sulfur dioxide, $SO_2$, may be used; it reduces $CrO_2F_2$ also to trivalent chromium, while it is oxidized to $SO_3$ which combines with the excess HF to fluorosulfonic acid, $F.SO_2.OH$. This acid has a boiling point of 163° C., at 760 mm. and stays in the aqueous residue of the next step in the HF recovery. This step is just a simple distillation of the $CrO_2F_2$-free system; pure hydrogen fluoride distills off first, while an aqueous residue containing the reduced trivalent chromium salts and any other nonvolatile or less volatile matter remains is stored for the recovery of chromium.

While in the foregoing description of this invention there have been shown certain illustrative processes, it will be understood that one skilled in the art may employ equivalent steps and compounds without departing from the spirit of my invention.

I claim:

1. The method of producing chromyl fluoride which comprises reacting one part by weight of chromium trioxide with about 12 or more parts by weight of anhydrous hydrogen fluoride, forming chromyl fluoride and water with an excess of hydrogen fluoride by said reaction, dissolving said water in said hydrogen fluoride to form a solution of excess hydrogen fluoride and water, cooling said mixture of chromyl fluoride and said solution to −78° C., liquefying said solution by said cooling, forming crystals of said chromyl fluoride insoluble in said solution at −78° C. and containing not more than a slight proportion of hydrogen fluoride, decanting said liquid solution from said insoluble crystals, and heating said crystals to 31.6° C. to melt said crystals.

2. The method of producing chromyl fluoride which comprises reacting one part by weight of chromium trioxide with about 12 or more parts by weight of anhydrous hydrogen fluoride, forming chromyl fluoride and water with an excess of hydrogen fluoride by said reaction, dissolving said water in said hydrogen fluoride to form a solution of excess hydrogen fluoride and water, cooling said mixture of chromyl fluoride and said solution to −78° C., liquefying said solution on by said cooling, forming crystals of said chromyl fluoride insoluble in said solution at −78° C. and containing not more than a slight proportion of hydrogen fluoride, decanting said liquid solution from said insoluble chromyl fluoride crystals, heating said chromyl fluoride crystals to 31.6° C. to melt said crystals, vaporizing said melted chromyl fluoride, contacting an alkali fluoride with said vaporized chromyl fluoride, reacting said slight proportion of hydrogen fluoride with said alkali fluoride, reacting said chromyl fluoride with said alkali fluoride in an equal molar proportion and recovering from said reaction mixture purified chromyl fluoride unreacted with said alkali fluoride.

References Cited in the file of this patent

Article in Journ. Amer. Chem. Soc., vol. 74, pages 5262–5264.

J. W. Mellor's "Inorganic and Theoretical Chemistry," vol. 11, pages 230, 362, 364. Longmans, Green and Co., N. Y.

Ephraim's "Inorganic Chemistry," page 484, 1943 ed. Nordeman Publishing Co., Inc., N. Y.

Lowry's "Inorganic Chemistry," page 1013, second ed.